(12) United States Patent
Chaumeret et al.

(10) Patent No.: US 7,461,813 B2
(45) Date of Patent: Dec. 9, 2008

(54) AIR INPUT DEVICE FOR A TURBOPROP ENGINE

(75) Inventors: Michel Chaumeret, Vendome (FR); Georges Mazeaud, Yerres (FR)

(73) Assignee: Snecma, Paris (FR)

( * ) Notice: Subject to any disclaimer, the term of this patent is extended or adjusted under 35 U.S.C. 154(b) by 188 days.

(21) Appl. No.: 10/553,989

(22) PCT Filed: Apr. 28, 2003

(86) PCT No.: PCT/FR03/01327

§ 371 (c)(1),
(2), (4) Date: Jul. 25, 2006

(87) PCT Pub. No.: WO2004/096641

PCT Pub. Date: Nov. 11, 2004

(65) Prior Publication Data

US 2007/0063097 A1 Mar. 22, 2007

(51) Int. Cl.
*B64D 33/02* (2006.01)

(52) U.S. Cl. .................. 244/53 B; 244/34 A; 244/129.4

(58) Field of Classification Search ............... 244/53 R, 244/53 B, 34 A, 34 B, 134 B, 129.4, 54, 55
See application file for complete search history.

(56) References Cited

U.S. PATENT DOCUMENTS

| 5,427,332 | A | * | 6/1995 | Rauckhorst et al. | ..... 244/134 A |
| 5,497,961 | A | * | 3/1996 | Newton | ........................ 244/54 |
| 5,941,061 | A | * | 8/1999 | Sherry et al. | .................. 60/798 |
| 6,129,509 | A | * | 10/2000 | Cousin et al. | ............ 415/121.2 |

FOREIGN PATENT DOCUMENTS

EP 0 971 111 1/2000

* cited by examiner

*Primary Examiner*—Jacob Y. Choi
*Assistant Examiner*—Michael Kreiner
(74) *Attorney, Agent, or Firm*—Oblon, Spivak, McClelland, Maier & Neustadt, P.C.

(57) ABSTRACT

An air intake layout for a turboprop. A nacelle surrounding an intake section of the turboprop behind the fan propeller can be moved away from the main part of the nacelle and can be divided into two parts that may be extracted so as to leave full access to the panel leading to equipment in a central compartment, whereas the panel was partially covered by the air intake leading edge.

7 Claims, 4 Drawing Sheets

AIR INPUT DEVICE FOR A TURBOPROP ENGINE

This invention relates to an air intake layout for a turboprop engine.

This type of layout includes a fan propeller extending in front of an air intake leading edge that surrounds an air intake section in the turboprop. There is also a shroud behind the propeller that also delimits the air intake section and encloses a compartment located around the propeller shaft and occupied by some turboprop equipment on which maintenance is necessary. Access to this equipment is obtained by opening a panel in the shroud. However, the air intake leading edge extends only very slightly behind the propeller in order to limit the length and weight of the turboprop and to maintain satisfactory aerodynamic performances. The result is that the air intake leading edge covers much of the panel in the shroud and makes it difficult to open it.

Therefore, the subject of the invention is to eliminate this problem. This is done using an air intake layout of the type mentioned above and characterized in that the leading edge is divided into two separable parts extending around complementary parts of the circumference, and in that the parts of the leading edge are assembled separably to a main part of the turboprop nacelle and form the rear part of this nacelle.

The parts of the leading edge can be separated to extract them from the turboprop and obtain unhindered access to the shroud opening panel and the equipment located inside it.

In one particular layout, the main part of the nacelle comprises a leak tight wall on which the leading edge is placed, and the parts of the leading edge are assembled separably to the main part of the nacelle through screws passing through the leak tight wall, engaged in tapped threads of the parts of the leading edge and with heads that can be accessed through a cover that opens onto the main part of the nacelle. The assembly system is simple and convenient.

Finally, it is possible that the separable parts of the leading edge can be assembled to each other when the leading edge is assembled to the main part of the nacelle. It is then advantageous if the parts of the leading edge are assembled together by flanges fitted with bolts, the flanges of one of the parts entering into the shroud of the said part and the flanges of the other part projecting from the shroud of the said other part. Once again, a simple assembly system is used, and particularly the offset between the joints in the shrouds of the parts of the leading edge and the assembly flanges can give improved leak tightness.

We will now describe the invention in detail with reference to the figures in which.

Figure 1:
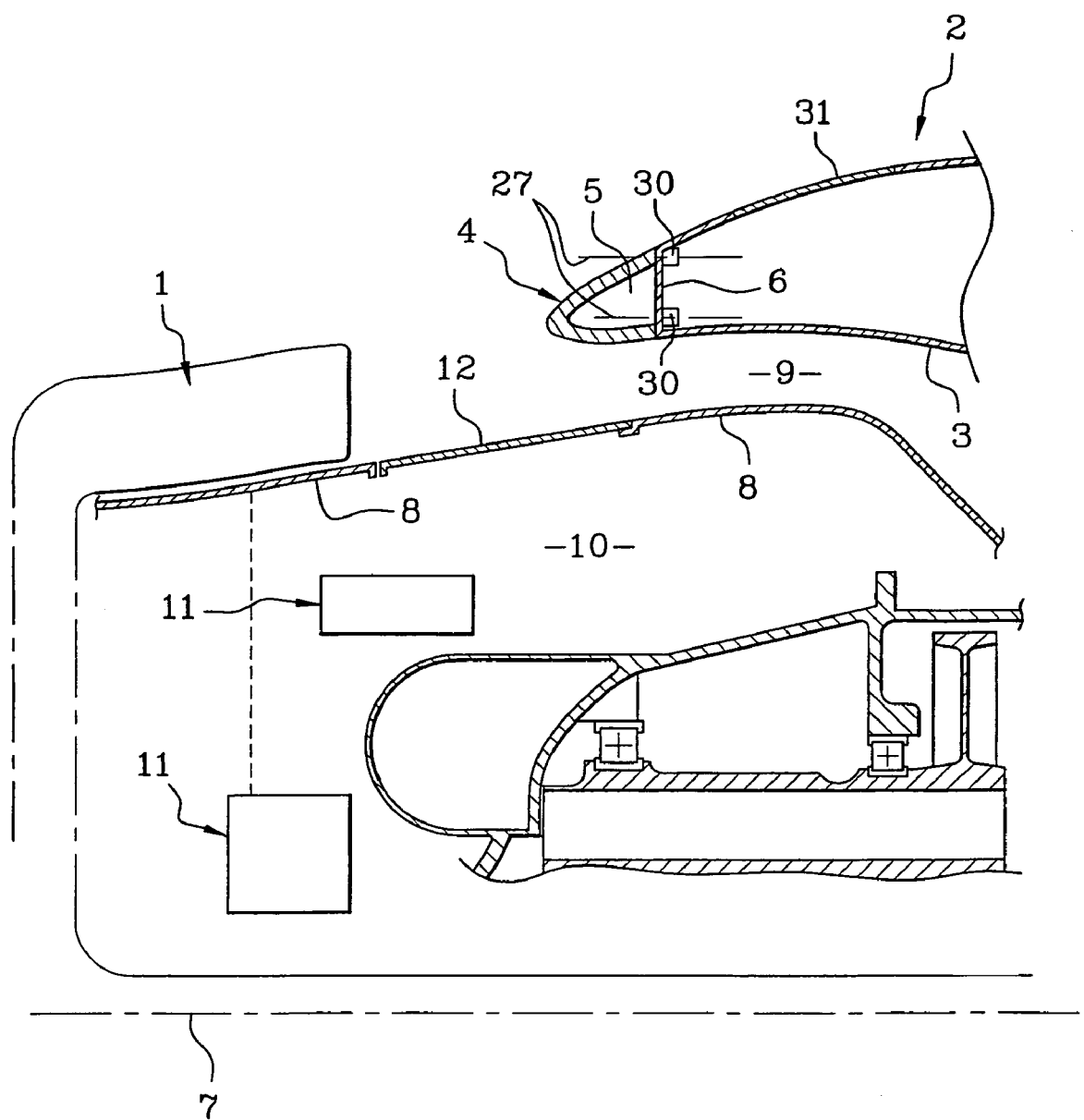
FIG. 1 is an overview of the air intake assembly in the assembled state.

A fan propeller 1 at a turboprop intake extends in front of a nacelle 2, in which a main part 3 is prolonged by a circular air intake leading edge 4 and for which the general shape of the section is a curved triangle with a vertex facing forwards and towards the propeller 1. The inside of the air intake leading edge 4 forms a de-icing containment 5 that is separated from the main part 3 by a leak tight wall 6 passing through the nacelle 2. The propeller 1 is supported by a shaft 7 around which there is a shroud 8 that delimits an air intake section 9 with the nacelle located around it. The shroud 8 of revolution encloses an angular compartment 10 that supports various turboprop equipment 11 supported by support means that are not shown. A removable panel 12 of the shroud 8 enables access to equipment 11 from the outside. It is assembled to the rest of the shroud 8 by ordinary means like attachment screws, hinges, etc. Its surface area is such that it necessarily extends partly under the leading edge.

Figure 2:
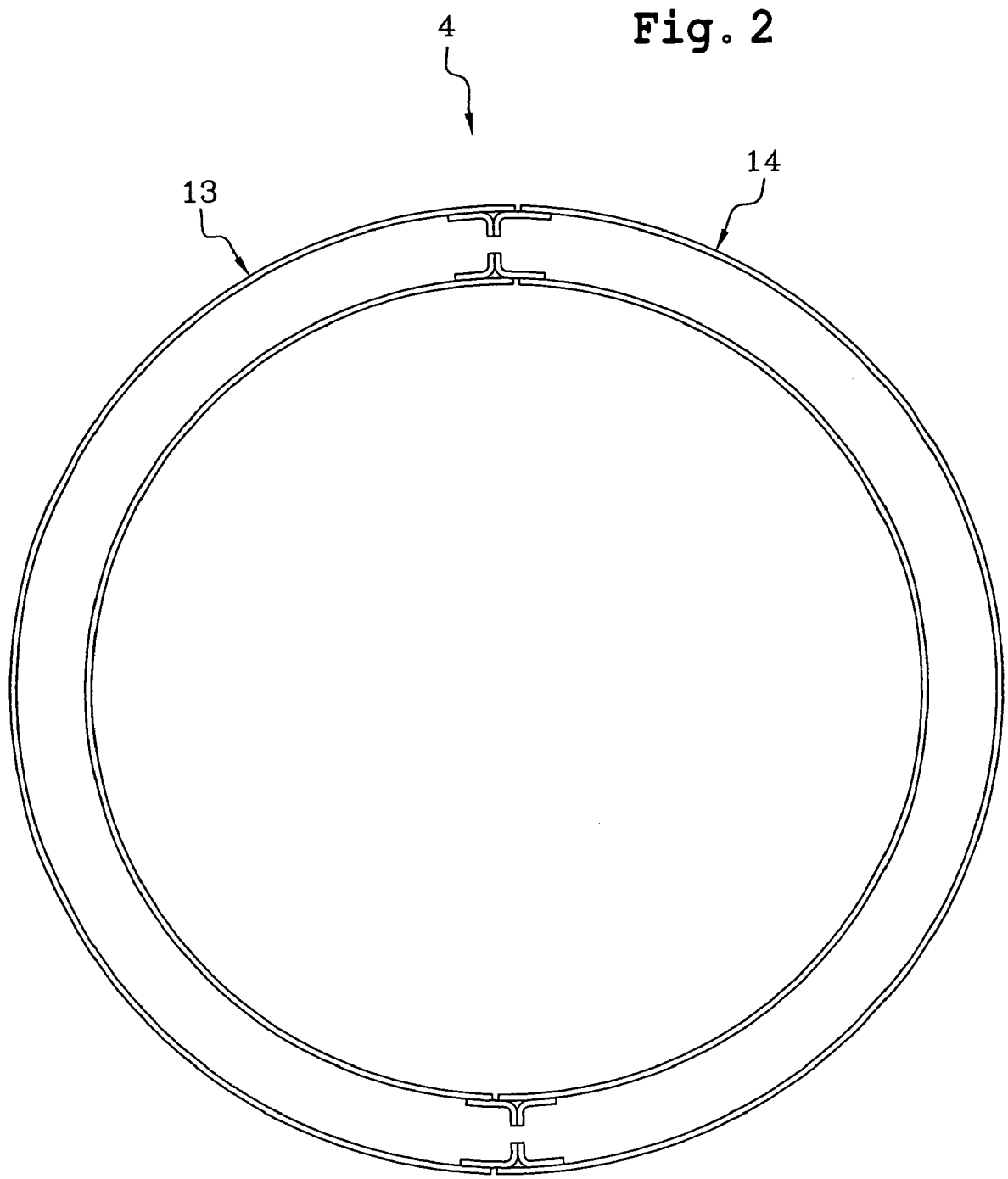
FIG. 2 is an overview of the air intake leading edge.
Figure 3:
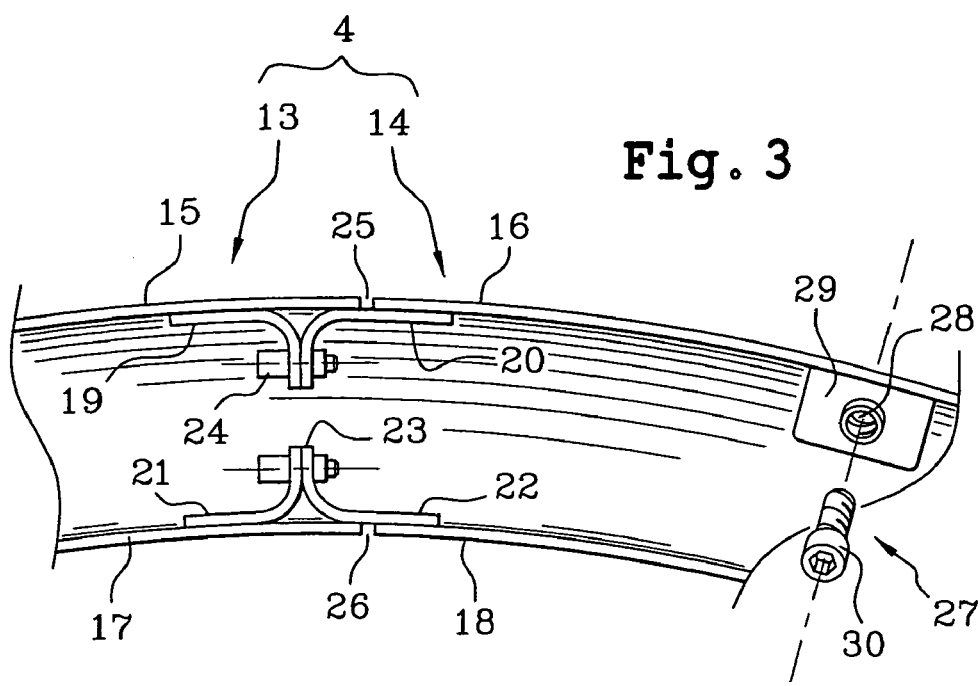
FIG. 3 is a partial view of the leading edge in the axial direction.

The leading edge 4 is composed of two parts 13 and 14, as can be seen in FIG. 2, that are approximately semi-circular in shape and extend around complementary parts of a circumference, and FIG. 3 shows the junction between them. Each comprises outer shrouds 15, 16 and inner shrouds 17, 18 and outer flanges 19, 20 and inner flanges 21, 22, they all have a cranked shape comprising a portion fixed to the associated shroud and a radial orientation portion 23 close to the edge of the shroud. The radial portions of the flanges 19 to 22 are used to assemble the outer flanges 15 and 16 to each other and the inner flanges 17 to 18 to each other, by inserting bolts 24 through them. It will be noted that the flanges 19 and 21 of the part 13 are slightly re-entrant into the shrouds 15 and 17, while the flanges 20 and 22 of the other parts 14 project slightly outside the shrouds 16 and 18. This avoids exposure of the bolted assemblies under the joint lines 25 and 26 of the shrouds of the parts 13 and 14 of the air intake leading edge 4, to improve the appearance and leak tightness, and to provide better protection for the flanges. The other junction of parts 13 and 14 is symmetric.

The leak tightness wall 6 comprises drillings through which screws 27 penetrate, and the rods of these screws engage in tapped threads 28 arranged on the tabs 29 of the parts 13 and 14 of the air intake leading edge 4, which is therefore screwed into the leak tightness wall 6 and the main part of the nacelle 3. The heads 30 of the screws 27 are supported on the leak tightness wall 6 behind the air intake nozzle. It can be accessed by providing the nacelle 2 with a removable cover 31 located behind the leak tight wall 6 and assembled to the nacelle in the same way as the panel 12 connected to the shroud 8.

Figure 4:
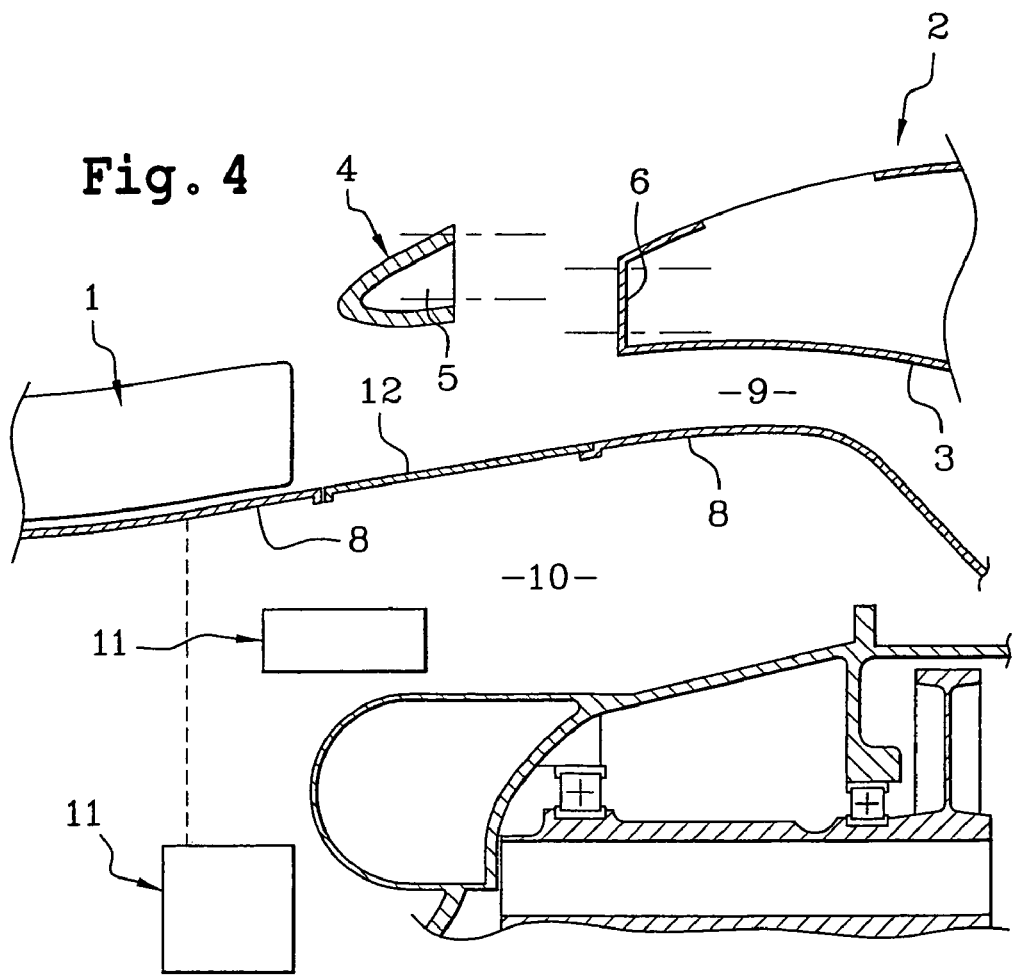
FIGS. 4 and 5 illustrate the two essential steps for disassembly of the air intake.
Figure 5:
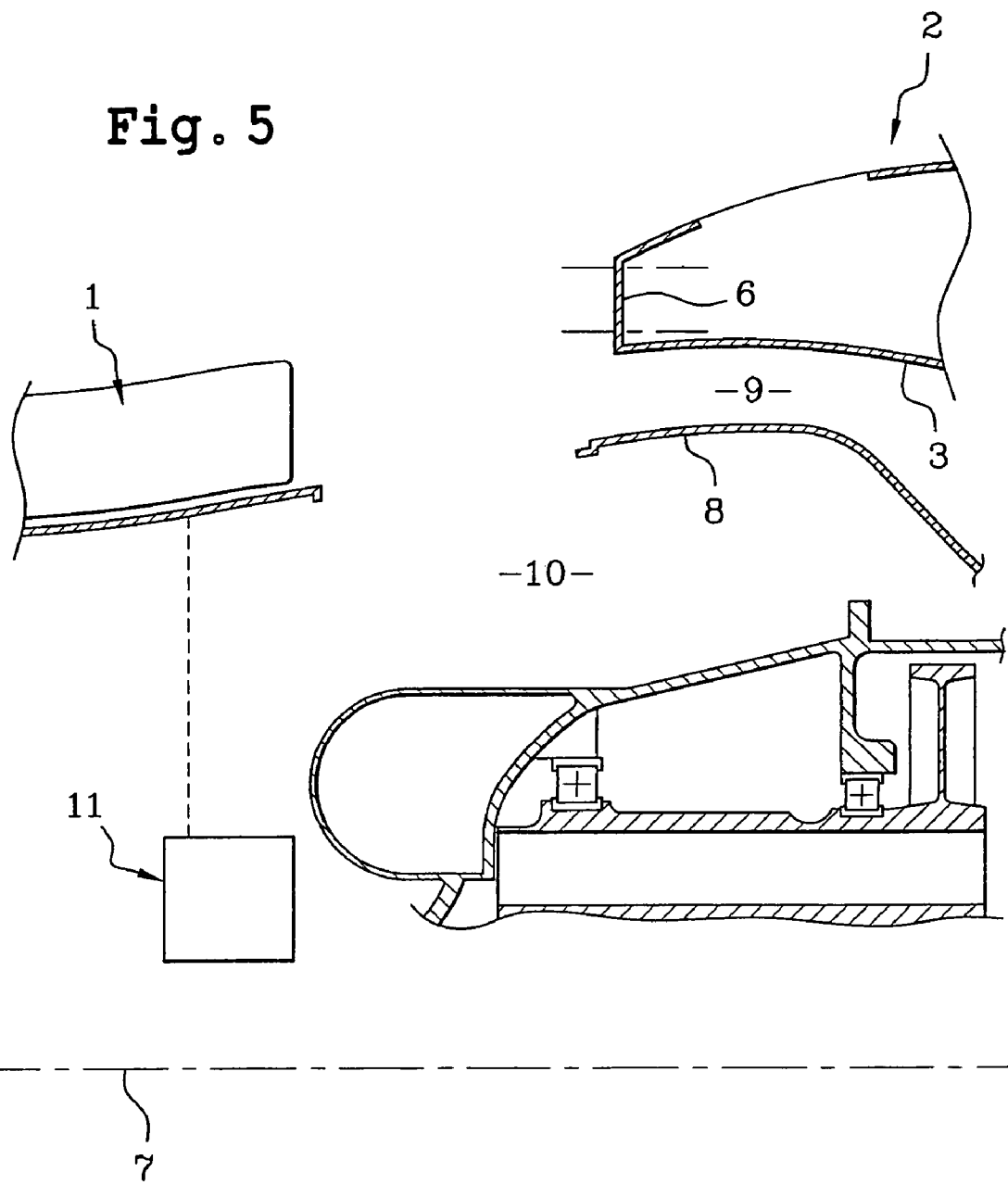

Therefore, the process to open the panel 12 is to open the cover 31, remove the screws 27, move the air intake leading edge towards the propeller 1 (FIG. 4), and remove the bolts 24 to separate the parts 13 and 14 before extracting these parts. The panel 12 can then be fully accessed, so that it can be opened without any difficulty (FIG. 5). The leading edge 4 of the air intake can be reassembled using the same procedure in the reverse order.

The invention would still be practicable if some changes were made to the embodiment described. Thus, the leading edge 4 of the air intake could be composed of more than two parts.

The invention claimed is:

1. Air intake layout for a turboprop engine comprising:
   a propeller;
   an air intake leading edge surrounding an air intake section and forming a rear end of a nacelle surrounding the turboprop, the air intake section surrounding a shroud that extends behind the propeller, encloses a compartment and is fitted with an opening panel located at least partially under the leading edge,
   wherein the leading edge is divided into two separable parts extending over complementary parts of a circumference, wherein said two separable parts of the leading edge are assembled separably to a leak tight wall included in a main part of the nacelle, and wherein the leading edge is placed on the leak tight wall wherein said two separable parts of the leading edge are assembled separably to the main part of the nacelle through screws passing through the leak tight wall.

2. An air intake layout according to claim 1, said screws are engaged in tapped threads of the parts of the leading edge and with heads that are accessed through a cover that opens onto the main part of the nacelle.

3. An air intake layout according to claim 2, wherein said two separable parts of the leading edge are assembled together by flanges fitted with bolts, the flanges of a first of the parts re-entering into a shroud of the part and the flanges of a second of the parts projecting from the shroud of the second of the parts.

4. An air intake layout according to claim 1, wherein said two separable parts of the leading edge are assembled together by flanges fitted with bolts, the flanges of a first of the parts re-entering into a shroud of the part and the flanges of a second of the parts projecting from the shroud of the second of the parts.

5. An air intake layout according to claim 1, wherein said leak tight wall is fixed to said main part and passes transversally through said nacelle so as to separate a de-icing containment from the main part of the nacelle, and wherein said leading edge connects to said main part via said leak tight wall.

6. An air intake layout according to claim 1, further comprising a removable cover positioned so that, when said removable cover is removed, said screws are accessible.

7. An air intake layout according to claim 6, wherein said removable cover is located on the main part of the nacelle, behind the leak tight wall.

* * * * *